United States Patent [19]
Rosaen et al.

[11] 4,399,033
[45] Aug. 16, 1983

[54] FLUID FILTERING DEVICE

[76] Inventors: Borje O. Rosaen, 4031 Thornoaks Dr., Ann Arbor, Mich. 48104; Dale P. Fosdick, 7000 Austin Rd., Saline, Mich. 48176

[21] Appl. No.: 259,247

[22] Filed: Apr. 30, 1981

[51] Int. Cl.³ ............................................. B01D 29/10
[52] U.S. Cl. ..................................................... 210/236
[58] Field of Search ................................. 210/236–238, 210/437, 438, 497.01; 5/451

[56] References Cited
U.S. PATENT DOCUMENTS
3,880,757 4/1975 Thomason ........................... 210/236

Primary Examiner—Ivars C. Cintins
Attorney, Agent, or Firm—Gifford, Van Ophem, Sheridan & Sprinkle

[57] ABSTRACT

A fluid filtering device is provided for use with a fluid reservoir. The filtering device comprises a housing having an elongated tubular and cylindrical part defining an interior chamber. A fluid port is formed at one end of the housing and the port is open to the chamber. The housing is secured within the reservoir so that the housing is submerged below the reservoir fluid level. A fluid passageway is formed through the housing to establish fluid communication between the fluid in the reservoir and the housing chamber. An elongated guide member is also secured to the upper end of the tubular housing part so that the guide member extends upwardly from the housing. A filter assembly comprising a tubular filter element and a coaxial elongated extension is manually insertable over both the guide member and the tubular housing part whereupon the filter element is fluidly positioned between the housing chamber and the fluid in the reservoir.

13 Claims, 2 Drawing Figures

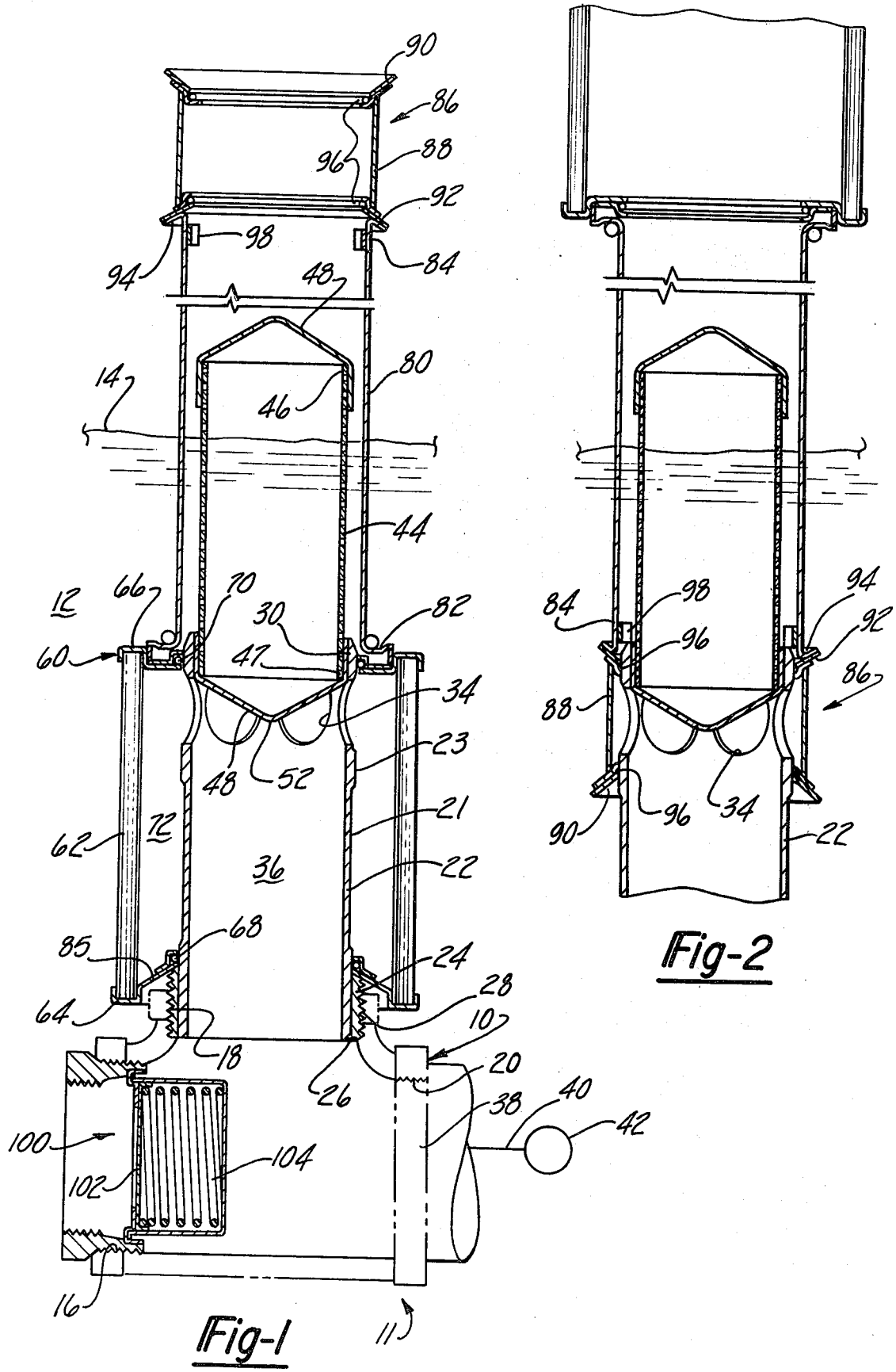

FLUID FILTERING DEVICE

BACKGROUND OF THE INVENTION

I. Field of the Invention

The present invention relates generally to filtering devices and, more particularly, to a filtering device which is adapted to be submerged within a fluid reservoir.

II. Description of the Prior Art

Hydraulic fluid systems conventionally include a reservoir of hydraulic fluid, a suction line for fluidly connecting the reservoir to a hydraulic pump and a fluid return line from the hydraulic system into the reservoir. The hydraulic fluid within the hydraulic system becomes contaminated during use and these contaminants must be removed or filtered from the hydraulic fluid in order to prevent damage to the hydraulic pump and other components of the hydraulic system. There have been a number of previously known fluid filtering devices which are fluidly connected to either the suction line of the reservoir or the return line to the reservoir to filter the hydraulic fluid.

In particular, there have been a number of previously known suction line filters which include a tubular cylindrical housing having one end positioned within the fluid reservoir and into which a filter assembly is slidably received. The filter assembly typically includes an elongated extension coaxially secured at one end to the filter element and upon insertion of the filter element into the housing, the filter element is spaced radially outwardly from the interior walls of the housing and is fluidly positioned between the reservoir and the hydraulic pump suction line.

One disadvantage of many of these previously known fluid filtering devices is that air is often entrapped within the filter element as the element is inserted into the housing. Large air pockets which are passed to the hydraulic system can cause excessive pump cavitation and other undesirable effects.

A still further disadvantage of many of these previously known fluid filtering devices is that the fluid flow through the filtering device is interrupted when the filter element is removed for cleaning and/or replacement. In many situations it would be desirable to maintain the fluid flow to the filtering device for the necessary periods of time when the filter element is removed from the filter device.

Still other types of previously known fluid filtering services include shut-off valves to prevent fluid flow while servicing the pumps. These shut-off valves, however, are very complex and, therefore, expensive in construction. Furthermore, these shut-off valves periodically require maintenance which requires that the entire fluid system be shut down while the maintenance is performed.

A still further disadvantage of many of the previously known fluid filtering devices is that the housing for the device which is submerged within the fluid reservoir must be specially fabricated from castings, stampings and the like. The special fabrication of the housing increases the overall cost of the fluid filtering device.

A still further disadvantage of many of the previously known fluid filtering devices is that the fluid system can continue to operate with the shut-off valve closed and without any exterior indication that the fluid supply is blocked producing the possibility of damage to the system.

SUMMARY OF THE PRESENT INVENTION

The present invention provides a fluid filtering device which overcomes all of the above mentioned disadvantages of the previously known filtering devices. In brief, the filtering device according to the present invention comprises a housing having an elongated tubular and cylindrical portion defining an interior chamber. An outlet fluid port formed in the housing is open to the chamber. The housing is mounted within the fluid reservoir so that the cylindrical portion extends generally vertically. At least one and preferably a plurality of inlet fluid ports are formed through the cylindrical portion near its upper end to establish fluid communication between the fluid in the reservoir and the cylindrical portion via the housing chamber.

An elongated and preferably cylindrical guide member is attached to the upper end of the cylindrical portion so that the guide member extends coaxially upwardly from the cylindrical portion. The guide member closes the upper end of the cylindrical portion and, in the preferred form of the invention, is dimensioned so that it extends above the fluid level within the reservoir.

The present invention further comprises a filter assembly having a tubular filter element open at each end and an elongated extension secured at one end to one end of the filter element. The entire filter assembly is insertable over both the guide member and the cylindrical portion of the housing to a filtering position in which the inlet fluid ports in the housing are positioned between the ends of the filter element. In addition, a seal member is provided around each end of the filter element to seal the filter element to the housing and to form an annular inlet chamber between the outer periphery of the housing and the inner periphery of the filter element. Simultaneously, the outer periphery of the filter element is open to the fluid in the reservoir.

The filtering device of the present invention is particularly suitable for use as a suction line filter so that the suction line from the pump is connected to the housing outlet port. Upon actuation of the fluid pump, the fluid from the reservoir is drawn through the filter element and into the annular inlet chamber thus removing contaminants from the fluid. From the annular inlet chamber, the fluid is inducted through the housing inlet ports, through the chamber and out through the housing outlet port to the fluid pump in the desired fashion. Moreover, the operation of the fluid system can continue even though the filter assembly is removed from the housing although no filtering of the fluid will occur when the filter assembly is removed.

In the preferred form of the invention, closure means are attached to the upper or free end of the extension assembly to block fluid flow through the filter device when desired. To accomplish this, the filter assembly is removed from the housing, inverted and reinserted into the housing port. The closure means comprises a closure tube having a fluid seal at each end adapted to fluidly engage the outer periphery of the housing port. The closure tube is dimensioned so that upon insertion over the housing port, the housing inlet ports are positioned between the ends of the closure tube thus closing the housing inlet ports and stopping fluid flow through the filtering device and to the pump so that the pump can be serviced.

BRIEF DESCRIPTION OF THE DRAWING

A better understanding of the present invention will be had upon reference to the following description when read in conjunction with the accompanying drawing, wherein like reference characters refer to like parts throughout the several views, and in which:

FIG. 1 is a longitudinal sectional view illustrating a preferred embodiment of the filtering device according to the present invention; and FIG. 2 is a fragmentary sectional view illustrating the operation of the closure means of the preferred form of the invention.

DETAILED DESCRIPTION OF A PREFERRED EMBODIMENT OF THE PRESENT INVENTION

With reference first to FIG. 1, a preferred embodiment of the fluid filtering device according to the present invention is thereshown and comprises a housing 11 having a lower part 10 and an upper part 22. The housing part 10 is positioned within a fluid reservoir 12 below the fluid level 14 of the reservoir 12. The lower housing part 10 preferably is a standard pipe T having three internally threaded openings 16, 18 and 20. The lower housing part 10 is positioned within the fluid reservoir 12 so that at least one opening 18 faces generally vertically upwardly.

The upper housing part 22 is tubular and cylindrical in shape and has an enlarged diameter portion 24 at its lower end 26. The outer periphery 28 of the enlarged diameter portion 24 is externally threaded so that the lower end 26 of the housing part 22 is threadably secured to the opening 18 of the lower housing part 10. Consequently, the longitudinal axis of the housing part 22 extends generally vertically upwardly. Furthermore, the housing part 22 is dimensioned so that it is entirely submerged below the fluid level 14 of the reservoir 12.

The housing part 22 is preferably constructed from a standard pipe and thus is open at both its lower end 26 and at its upper end 30. The enlarged diameter portion 24 at the lower end 26 of the housing part 22 is preferably formed by welding a short but larger diameter pipe fitting to the lower end of the housing part 22. In addition, the housing part 22 includes a reduced diameter portion 21 which serves as a gripping surface for a wrench when used to screw the housing part 22 into the opening 18 in the lower housing part 10. Thus, any marring or abrasions caused by the wrench on the housing part 22 will be recessed from the outer periphery 23 of the housing part 22.

At least one and preferably a plurality of circumferentially spaced inlet fluid ports 34 are formed through the housing part 22 closely adjacent its upper end 30. These inlet ports 34 establish fluid communication between the reservoir 12 and an internal chamber 36 defined by the housing parts 22 and 10. This chamber 36 is open to the housing opening 20 which forms a fluid outlet 38 from the filtering device. This fluid outlet 38 is coupled by a fluid line 40 to the suction inlet of a pump 42.

A bypass valve assembly 100 is positioned within and normally closes the third housing opening 16. The bypass valve assembly 100 includes a valve member 102 urged towards a closed position by a compression spring 104. When the differential pressure between the housing chamber 36 and the reservoir 12 exceeds a predetermined amount, the valve member 102 will open against the force of the spring 104 and permit fluid to flow through the opening 16 and directly to the housing outlet 38.

An elongated tubular and cylindrical guide member 44 is attached to the upper end 30 of the housing part 22 so that the guide member 44 extends coaxially upwardly from the housing part 22. The guide member 44 is longitudinally dimensioned so that its free end 46 extends above the fluid level 14 of the reservoir 12. Conically shaped end pieces 48 are attached across and close the upper and lower ends 46 and 47 of the guide member 44 so that the conical end pieces 48 face away from each other. The lower end piece 48 is attached to the housing 22 across the tops of the fluid ports 34 so that the apex 52 of the lower end piece 48 extends downwardly in front of the fluid ports 34 for a reason to be subsequently described.

The filtering device according to the present invention further comprises an elongated filter assembly 60 which is slidably insertable over the housing part 22 to the position shown in FIG. 1. The filter assembly 60 comprises a tubular cylindrical filter element 62 open at its lower end 64 and at its upper end 66. Annular fluid seals 68 and 70 are provided around both the lower end 64 and the upper end 66 of the filter element 62 which sealingly engage the outer periphery 23 of the housing part 22. The filter element 62 thus forms an annular inlet chamber 72 between the inner periphery of the filter element 62 and the outer periphery of the housing part 22. The filter element 62 is also dimensioned so that the housing fluid ports 34 are positioned intermediate the fluid seals 68 and 70 as shown in FIG. 1 so that the annular inlet chamber 72 is open to the housing chamber 36 via the fluid ports 34. The enlarged diameter portion 24 at the lower end of the housing part 22 forms a stop member which abuts against the lower end of the filter element 62 and limits the insertion of the filter element 62 over the housing part 22.

A pair of straps 80 are attached at their lower ends 82 to the upper end 66 of the filter element 62 so that the straps 80 extend upwardly coaxial from the filter element 62. The upper free ends 84 of the straps 80 are welded to a member 92 positioned above the fluid and serve as a handle for manually installing or removing the filter element 62 from the housing part 22.

The filter element 62 includes a frusto-conical shaped retainer 85 at its lower end. The retainer 85 cooperates with the upper conical end piece 48 on the extension tube to align the filter assembly 60 with the guide member 44 as the filter assembly 60 is inserted onto the housing part 22.

With reference now to FIGS. 1 and 2, a closure assembly 86 is attached to the upper or free end 84 of the straps 80 for blocking fluid flow through the filtering device when desired. The closure assembly 86 comprises a closure tube 88 having an inwardly facing conical guide piece 90 attached to its upper end and a member 92 attached to its lower end. The member 92 is attached, preferably by welding, to an outwardly bent portion 84 at the upper ends 84 of the straps 80. Annular fluid seals 96 are attached around the inner periphery of the closure tube 88 adjacent each piece 90 and 92.

With reference now particularly to FIG. 2, in order to block the fluid flow through the filter device, the straps 80 along with the filter element 62 are removed from the housing part 22, inverted and reinserted over the housing part 22. In doing so, the fluid ports 34 in the housing part 22 are positioned between the ends of the closure tube 88 and, simultaneously, the fluid seals 96 engage and fluidly seal the closure tube 88 to the housing part 22 thus blocking fluid flow through the fluid ports 34. One or more stop members 98 are secured to the inside of the straps 80 immediately below the outwardly bent portions 94 which limit the insertion of the closure tube 88 over the housing part 22 to ensure that the housing fluid ports 34 are positioned within the closure tube 88 in the desired fashion. Similarly, the conical guide member 90 facilitates the alignment and insertion of the closure assembly 86 over the guide member 44 on the housing part 22.

With reference now to FIG. 1, in operation the filter assembly 60 is inserted to a filtering position over both the guide member 44 and housing part 22 until the lower end of the filter element 62 abuts against the housing enlarged diameter portion 24. In doing so, the guide member 44 both facilitates and guides the filter assembly 60 onto the housing 22. Similarly, the reduced diameter portion 21 on the housing part 22 ensures that any abrasions on the reduced diameter portion 21 caused by assembly of the housing 22 does not contact or abrade the lower fluid seal 68.

With the filter assembly 60 positioned as shown in FIG. 1, the fluid seals 68 and 70 sealingly engage the outer periphery of the housing part 22 thus forming the annular inlet fluid chamber 72 while the outer periphery of the filter element 62 is open to the fluid in the fluid reservoir 12. Upon actuation of the pump 42, the pump draws fluid from the reservoir 12, through the filter element 62 and into the annular inlet chamber 72. From the chamber 72, the fluid flows through the fluid ports 34, the housing chamber 36 and out through the fluid outlet 38 in the desired fashion.

In the event that the filter element 62 becomes excessively clogged from contaminants, this clogging will cause a differential pressure between the interior housing chamber 36 and the fluid reservoir 12. When this differential pressure exceeds a predetermined amount, indicative of excessive clogging of the filter element 62, the bypass assembly 100 will open in the conventional fashion and permit fluid to flow directly from the reservoir 12 and to the outlet 38 thus enabling continued operation of the fluid system.

When cleaning and/or replacement of the filter element 62 is desired, the entire filter assembly 60 is manually removed from the housing part 22 by the straps 80. During and after removal, however, the housing fluid ports 34 are directly open to the fluid reservoir 12 so that operation of the fluid system can continue. If desired, however, this fluid flow can be terminated by the closure assembly 86 in the fashion previously described.

From the foregoing, it can be seen that the fluid filtering device of the present invention is greatly advantageous over the previously known fluid filtering devices. In particular, the housing 11 is constructed from a conventional pipe fitting which is readily available at low cost which eliminates the previously known necessity to specially fabricate the housing from castings or stampings.

A still further advantage of the fluid filtering device of the present invention is that the filter element 62 is open at both its upper and lower ends which minimizes or altogether eliminates the entrapment of air within the filter element 62 as it is inserted over the housing part 22. Furthermore, the accumulation of large air pockets within the inlet chamber 72 from air entrained within the fluid is eliminated by positioning the housing inlet ports 34 closely adjacent the upper end of the filter element 62. Furthermore, the conically shaped end piece 48 at the lower end of the guide tube 44 directs the fluid flow through the fluid ports 34 downwardly toward the lower open end 26 of the housing part 22 which minimizes the turbulence of the fluid flow through the housing chamber 36.

A still further advantage of the present invention is that the filter element 62, when properly positioned around the housing part 22, positions and supports the upper ends of the straps 80 above the fluid level 14 of the reservoir 12. This provides a visual indication that the filter element 62 is installed around the housing part in the operative position.

Although the filtering device of the present invention has been described as a suction line filter device, it can also be used as a return line filter by providing appropriate valving and by reversing the fluid flow direction.

Having described our invention, however, still further modification will become apparent to those skilled in the art to which it pertains without deviation from the spirit of the invention as defined by the scope of the appended claims.

We claim:

1. A fluid filtering device for use with a fluid reservoir in which a fluid is contained comprising:
   a housing defining an interior chamber, said housing having a tubular cylindrical part and a fluid port open to said chamber and adapted for connection with a fluid system,
   said housing being adapted to be positioned in said reservoir so that said housing is submerged below the fluid level of the reservoir,
   fluid passage means formed through said housing for establishing fluid communication between the fluid in the reservoir and said housing chamber,
   an elongated guide member secured at one end to and extending coaxially outwardly from one end of the tubular cylindrical housing part,
   a filter assembly slidably insertable over said housing part comprising:
   a tubular filter element open at each end,
   an elongated extension secured at one end to one end of the filter element,
   wherein said filter assembly is insertable over said guide member and over said tubular housing part to a filtering position so that said fluid passage means are positioned intermediate the ends of the fluid element,
   means for fluidly sealing the end of the filter element to said housing, and
   means attached to the opposite end of said extension for closing said fluid passage means upon inverting said filter assembly and inserting the inverted filter assembly over said housing part.

2. The invention as defined in claim 1 wherein said guide member is dimensioned so that it extends above the fluid level in the reservoir.

3. The invention as defined in claim 1 and further comprising stop means for limiting the insertion of said filter assembly over said housing part.

4. The invention as defined in claim 1 wherein said closing means further comprises a closure tube insertable over said housing so that said fluid passage means are positioned intermediate the ends of the closure tube, and means for fluidly sealing the opposite ends of the closure tube to the housing part.

5. The invention as defined in claim 4 and further comprising means for limiting the insertion of said closure tube over said housing part.

6. The invention as defined in claim 1 wherein said housing is constructed from a standard pipe fitting.

7. The invention as defined in claim 6 wherein said tubular housing part comprises a pipe fitting having a reduced outer diameter portion along its length which forms a tool gripping surface.

8. The invention as defined in claim 7 wherein said housing further comprises a T fitting having at least two openings, said one pipe fitting being secured to one opening and the other opening forming said fluid port.

9. The invention as defined in claim 1 wherein said fluid passage means comprises a plurality of further fluid ports formed through the housing part closely adjacent said one end of said filter element when said filter assembly is in said filtering position.

10. The invention as defined in claim 9 and further comprising means for directing fluid flow through said fluid passage means from said one end of the housing part and toward the other end of the housing part.

11. The invention as defined in claim 10 wherein said directing means comprises a conical end piece attached to said one end of the guide member, said conical end piece having its apex extending toward said other end of the housing part, and at least a portion of said conical end piece being aligned with said further ports.

12. The invention as defined in claim 1 wherein said guide member is dimensioned so that its other end extends above the fluid level in the reservoir.

13. The invention as defined in claim 1 and further comprising a conical end piece attached to the other end of the guide member which aligns the filter assembly with the guide member.

* * * * *

UNITED STATES PATENT AND TRADEMARK OFFICE
CERTIFICATE OF CORRECTION

PATENT NO. : 4,399,033

DATED : August 16, 1983

INVENTOR(S) : Borje O. Rosaen

It is certified that error appears in the above—identified patent and that said Letters Patent is hereby corrected as shown below:

Column 4, line 59, delete "84" (first occurrence) insert --94--.

Signed and Sealed this

Sixth Day of March 1984

[SEAL]

Attest:

GERALD J. MOSSINGHOFF

Attesting Officer

Commissioner of Patents and Trademarks